United States Patent
Watanabe

(10) Patent No.: US 10,417,505 B2
(45) Date of Patent: Sep. 17, 2019

(54) VEHICLE DETECTION WARNING DEVICE AND VEHICLE DETECTION WARNING METHOD

(71) Applicant: Alpine Electronics, Inc., Shinagawa-ku, Tokyo (JP)

(72) Inventor: Takayuki Watanabe, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 77 days.

(21) Appl. No.: 15/232,917

(22) Filed: Aug. 10, 2016

(65) Prior Publication Data
US 2017/0098130 A1    Apr. 6, 2017

(30) Foreign Application Priority Data
Oct. 1, 2015 (JP) .................................. 2015-196284

(51) Int. Cl.
*G06K 9/00* (2006.01)
*H04N 5/232* (2006.01)

(52) U.S. Cl.
CPC ................. *G06K 9/00805* (2013.01)

(58) Field of Classification Search
None
See application file for complete search history.

(56) References Cited

U.S. PATENT DOCUMENTS

| | | | | |
|---|---|---|---|---|
| 6,097,023 A | * | 8/2000 | Schofield | B60N 2/002 250/208.1 |
| 6,734,904 B1 | * | 5/2004 | Boon | H04N 7/183 348/149 |
| 8,594,919 B2 | * | 11/2013 | Munakata | G01C 21/26 701/300 |
| 9,129,159 B2 | * | 9/2015 | Cardoso | B60Q 1/50 |
| 2005/0058323 A1 | * | 3/2005 | Brodsky | G06K 9/3241 382/104 |
| 2007/0221822 A1 | * | 9/2007 | Stein | B60Q 1/143 250/205 |
| 2007/0265777 A1 | * | 11/2007 | Munakata | G01C 21/26 701/301 |

(Continued)

FOREIGN PATENT DOCUMENTS

| | | |
|---|---|---|
| JP | 3-296200 | 12/1991 |
| JP | 8-193831 | 7/1996 |

(Continued)

*Primary Examiner* — Mohammad J Rahman
(74) *Attorney, Agent, or Firm* — Brinks Gilson & Lione

(57) ABSTRACT

A vehicle detection warning device may have a rear camera, a vehicle detecting unit that detects a rear vehicle according to high-brightness regions included in obtained images, a warning start deciding unit that causes a warning processing unit to start a warning when the rear vehicle is detected, a summarizing unit that counts the number of times the high-brightness region is included in images obtained by a plurality of imaging operations performed by the rear camera, an area calculating unit that calculates the area of the high-brightness region, and a warning termination deciding unit that causes the warning processing unit to stop the warning when the number of times counted by the summarizing unit decreases and the area calculated by the area calculating unit falls to or below a predetermined value.

5 Claims, 5 Drawing Sheets

(56) References Cited

U.S. PATENT DOCUMENTS

| | | | | |
|---|---|---|---|---|
| 2008/0181461 | A1* | 7/2008 | Saito | G06K 9/00825 |
| | | | | 382/104 |
| 2009/0174809 | A1* | 7/2009 | Mochida | G03B 7/28 |
| | | | | 348/362 |
| 2009/0251563 | A1* | 10/2009 | Mochida | G03B 7/08 |
| | | | | 348/229.1 |
| 2010/0091513 | A1* | 4/2010 | Kamioka | B60Q 1/1423 |
| | | | | 362/523 |
| 2012/0287276 | A1 | 11/2012 | Dwivedi et al. | |
| 2012/0300074 | A1* | 11/2012 | Hasegawa | H04N 5/235 |
| | | | | 348/148 |
| 2013/0321142 | A1* | 12/2013 | Cardoso | B60Q 1/50 |
| | | | | 340/458 |
| 2014/0002654 | A1* | 1/2014 | Irie | G06K 9/00791 |
| | | | | 348/148 |
| 2015/0201120 | A1* | 7/2015 | Irie | H04N 5/2171 |
| | | | | 348/148 |
| 2015/0203076 | A1* | 7/2015 | Irie | H04N 5/2171 |
| | | | | 134/56 R |

FOREIGN PATENT DOCUMENTS

| | | |
|---|---|---|
| JP | 2003-208602 | 7/2003 |
| JP | 2010-92422 | 4/2010 |
| JP | 2013-025568 | 2/2013 |
| JP | 2013-25568 | 2/2013 |
| KR | 10-2007-0004300 | 1/2007 |

* cited by examiner

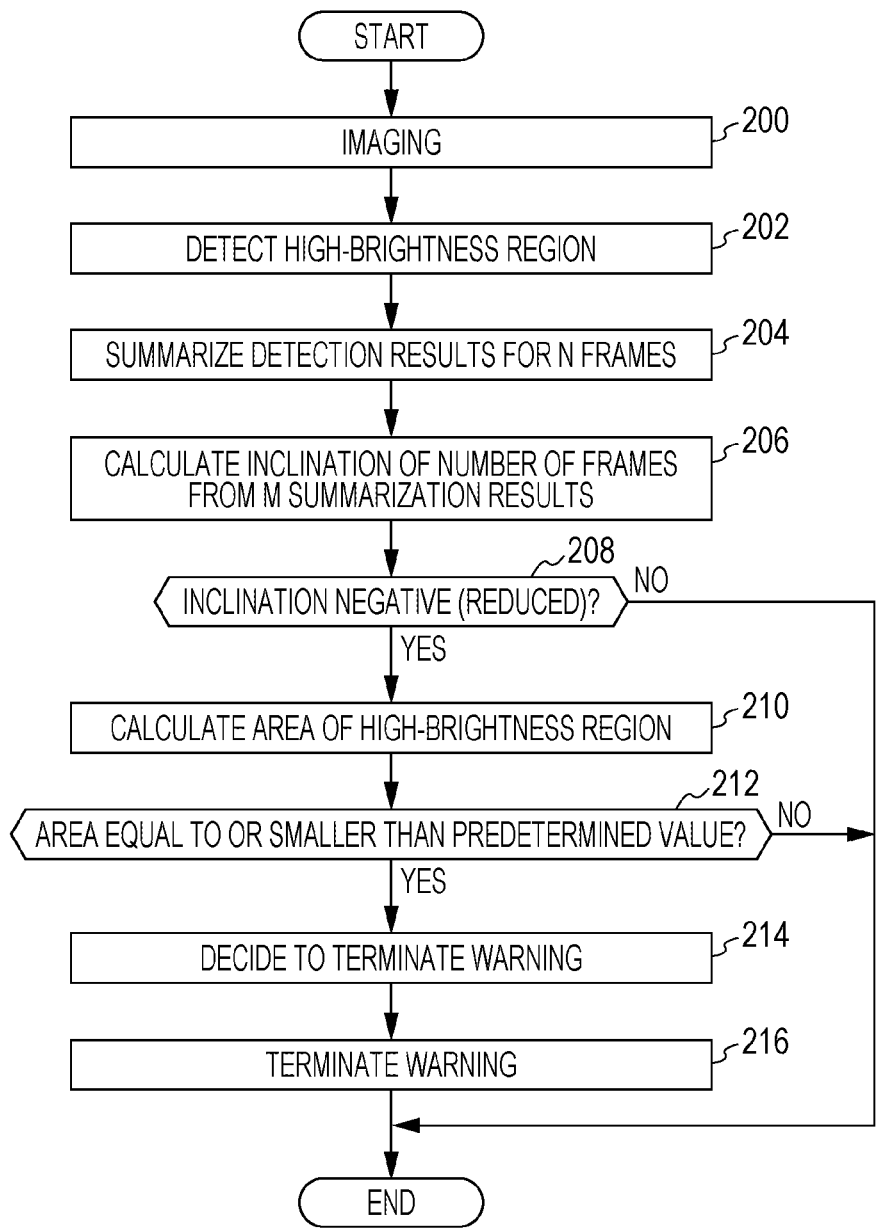

VEHICLE DETECTION WARNING DEVICE AND VEHICLE DETECTION WARNING METHOD

RELATED APPLICATIONS

The present application claims priority to Japanese Patent Appln. No. 2015-196284, filed Oct. 1, 2015, the entirety of which is hereby incorporated by reference.

BACKGROUND

1. Field of the Disclosure

The present disclosure relates to a vehicle detection warning device and a vehicle detection warning method that generate a warning when another vehicle is approaching a vehicle from behind that is traveling, for example, at night.

2. Background Art

In a conventional method known in the prior art, images captured by a camera are employed to detect a vehicle that is traveling at night by using information about the color of the lamps of the vehicle (see BACKGROUND OF THE INVENTION in Japanese Unexamined Patent Application Publication No. 2013-25568, for example). This enables the driver in the vehicle of interest to be warned when another vehicle on an adjacent lane is approaching the vehicle of interest from behind. This warning needs to be continued until the other vehicle passes the vehicle of interest. As described above, to detect the other vehicle that is approaching the vehicle of interest from behind, information about the color of the headlight of the other vehicle (brightness information) is used. When the color information disappears from the captured images, the warning can be terminated, assuming that the other vehicle has passed the vehicle of interest.

SUMMARY

The method disclosed in Japanese Unexamined Patent Application Publication No. 2013-25568 is problematic in that even if the other vehicle has passed the vehicle of interest, if lit street lamps, lamps in a tunnel, or the like are present in a subsequently captured image, these lamps may be incorrectly detected as the headlight of the other vehicle that has passed the vehicle of interest and a time to terminate the warning may thereby be delayed.

Japanese Unexamined Patent Application Publication No. 2013-25568 describes that the outside shapes of high-brightness regions in images are extracted to track positions and motions, in captured images, that change with time for high-brightness regions that are part of the extracted outside shapes, each high-brightness region having a first shape that is a circular shape or nearly circular shape, a second shape that is a longitudinally-long elliptical shape or nearly longitudinally-long elliptical shape, or a third shape obtained by combining the first shape and second shape vertically or horizontally, and a decision is made as to whether another vehicle is approaching the vehicle of interest according to a tracking result. However, if this method is used, specific shapes needs to be distinguished by pattern recognition, resulting in complex processing. In addition, it may be difficult to distinguish the second shape or third shape depending on the road condition. Therefore, there is a demand for a method by which a warning is reliably terminated when another vehicle has passed the vehicle of interest.

The present disclosure addresses the above situation with the object of providing a vehicle detection warning device and vehicle detection warning method that uses the headlight of another vehicle to detect that it is approaching and generates a warning and can reliably terminate the warning when the other vehicle has passed the vehicle of interest.

To address the above problems, vehicle detection warning devices according to forms of the present disclosure have: an imaging means that captures an image behind a vehicle of interest; a vehicle detecting means that detects another vehicle that is approaching the vehicle of interest in the lane in which the vehicle of interest is traveling or in an adjacent lane, according to high-brightness regions included in images obtained by imaging performed by the imaging means; a warning means that warns the driver of the vehicle of interest in a certain manner to notify the driver that the other vehicle is approaching; a warning start deciding means that causes the warning means to start a warning when the vehicle detecting means detects the other vehicle; a counting means that counts the number of times the high-brightness region is included in images obtained by a plurality of imaging operations performed by the imaging means; an area calculating means that calculates the area of the high-brightness region; and a warning stop deciding means that causes the warning means to stop the warning when the number of times counted by the counting means decreases and the area calculated by the area calculating means falls to or below a predetermined value.

Vehicle detection warning methods according to forms of the present disclosure have: a step in which an imaging means captures an image behind a vehicle of interest; a step in which a vehicle detecting means detects another vehicle that is approaching the vehicle of interest in the lane in which the vehicle of interest is traveling or in an adjacent lane, according to high-brightness regions included in images obtained by imaging performed by the imaging means; a step in which a warning means warns the driver of the vehicle of interest in a certain manner to notify the driver that the other vehicle is approaching; a step in which a warning start deciding means causes the warning means to start a warning when the vehicle detecting means detects the other vehicle; a step in which a counting means counts the number of times the high-brightness region is included in images obtained by a plurality of imaging operations performed by the imaging means; a step in which an area calculating means calculates the area of the high-brightness region; and a step in which a warning stop deciding means causes the warning means to stop the warning when the number of times counted by the counting means decreases and the area calculated by the area calculating means falls to or below a predetermined value.

While the vehicle of interest is traveling, for example, at night or in a tunnel, a high-brightness region corresponding to the headlight of another vehicle is detected. Therefore, it is possible to detect the other vehicle that is approaching and to start a warning. When the number of times the high-brightness region is counted decreases and the area of the high-brightness region falls to or below a predetermined value, the warning is terminated. Therefore, effects by street lamps, lamps in a tunnel, and other peripheral light other than the headlight of the other vehicle can be lessened, and when the other vehicle has passed the vehicle of interest, the warning can be reliably terminated.

The imaging means described above preferably performs imaging at a predetermined frame rate, and the counting means preferably summarizes, as the number of times, the number of frames that includes the high-brightness region from images for N frames obtained up to now. Thus, it is possible to prevent a malfunction in which peripheral light is detected as a high-brightness region and a warning is thereby generated.

The warning stop deciding means described above preferably decides whether the number of times counted by the counting means has decreased, according to a plurality of counting results of the number of times counted by the counting means. Particularly, the warning stop deciding means preferably uses the least squares method to calculate the inclination of a plurality of times counted by the counting means. If the inclination is negative, the warning stop deciding means preferably decides that the number of times counted by the counting means has decreased. Thus, it is possible to eliminate temporary effects such as incorrect detection, to highly precisely decide that the other vehicle has passed the vehicle of interest, and to terminate the warning at an appropriate time.

When the number of times counted by the counting means reaches a predetermined value, the warning start deciding means preferably decides to start the warning. This enables the warning to be started when it is ascertained that the other vehicle is approaching the vehicle of interest.

BRIEF DESCRIPTION OF THE DRAWINGS

FIG. 5 is a flowchart illustrating an operation procedure for terminating the warning operation after it has been started.

DETAILED DESCRIPTION OF THE DRAWINGS

Figure 1:
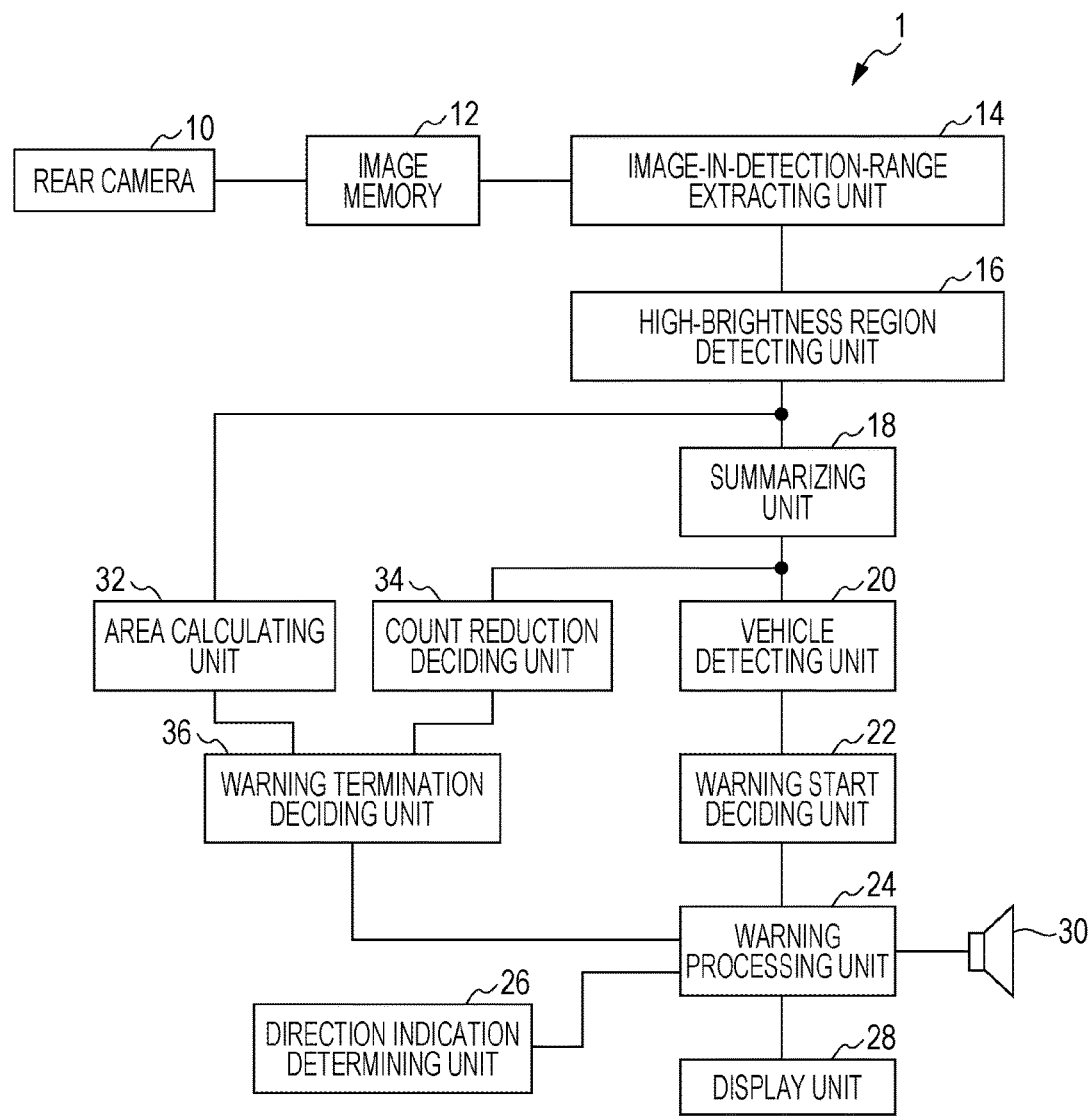
FIG. 1 is a block diagram illustrating the structure of a vehicle detection warning device.

A vehicle detection warning device in an embodiment to which the present invention is applied will be described below with reference to the drawings. FIG. 1 is a block diagram illustrating the structure of a vehicle detection warning device. As illustrated in FIG. 1, the vehicle detection warning device 1 has a rear camera 10, an image memory 12, an image-in-detection-range extracting unit 14, a high-brightness region detecting unit 16, a summarizing unit 18, a vehicle detecting unit 20, a warning start deciding unit 22, a warning processing unit 24, a direction indication determining unit 26, a display unit 28, a speaker 30, an area calculating unit 32, a count reduction deciding unit 34, and a warning termination deciding unit 36. One of skill in the art will appreciate that in some implementations, a processor such as a central processing unit (CPU) may execute instructions to perform operations of one or more of the image-in-detection-range extracting unit 14, the high-brightness region detecting unit 16, the summarizing unit 18, the vehicle detecting unit 20, the warning start deciding unit 22, the warning processing unit 24, the direction indication determining unit 26, the area calculating unit 32, the count reduction deciding unit 34, and the warning termination deciding unit 36.

The vehicle detection warning device 1 is mounted in a vehicle of interest. Upon the detection of another vehicle that is approaching the vehicle of interest from behind, on the right or left side, which becomes a blind spot of the driver, the vehicle detection warning device 1 starts to warn the driver of the vehicle of interest in a certain manner. When the other vehicle has passed the vehicle of interest, the vehicle detection warning device 1 terminates the warning.

The rear camera 10 is mounted at the back of the vehicle of interest. The imaging range of the rear camera 10 includes the driving lane, in which the vehicle of interest is traveling, and adjacent lanes on the right and left sides. As the rear camera 10, it is desirable to use, for example, a camera that employs a charge-coupled device (CCD) imaging device or metal-oxide-semiconductor (CMOS) imaging device and has a fish-eye lens to widen the angle of view.

Figure 2:
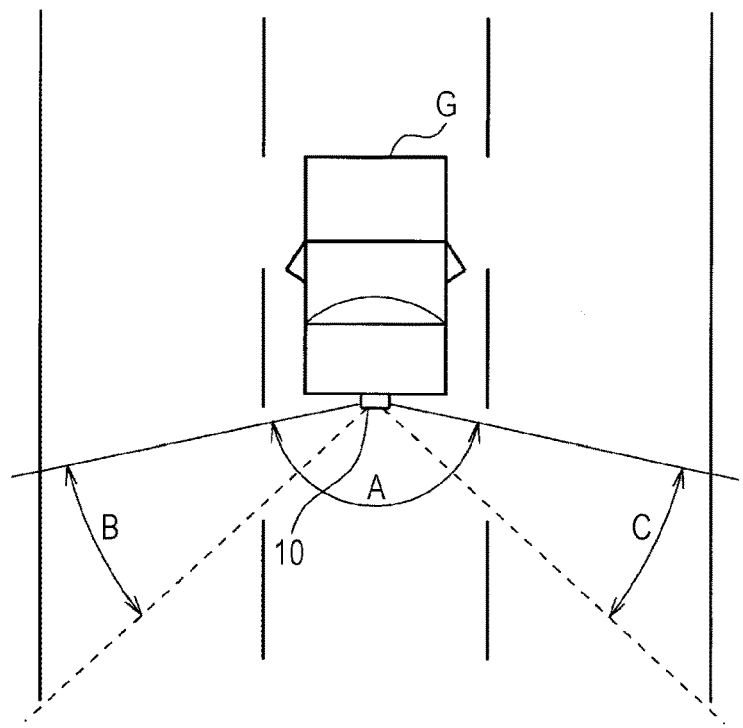
FIG. 2 illustrates a position at which a rear camera is mounted and the imaging range of the rear camera.
Figure 3:
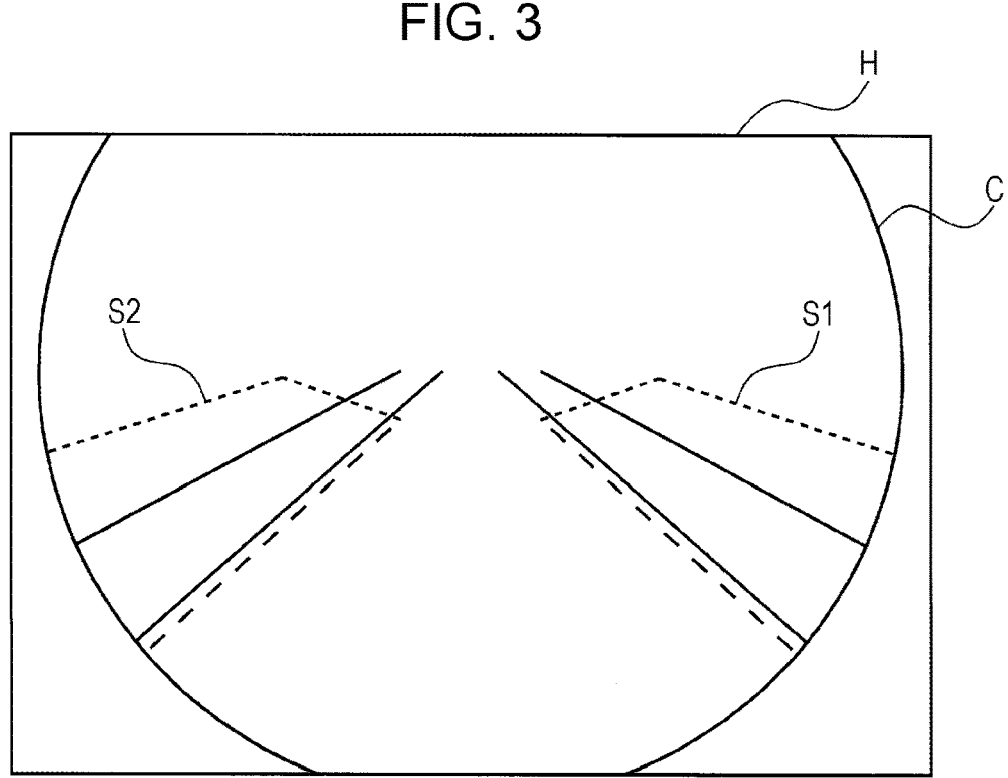
FIG. 3 illustrates an image captured by the rear camera as well as a relationship between a left-side partial image and right-side partial image on the captured image.

FIG. 2 illustrates a position at which the rear camera 10 is mounted and the imaging range of the rear camera 10. FIG. 3 illustrates an image captured by the rear camera 10 as well as a relationship between a left-side partial image and right-side partial image on the captured image.

As illustrated in FIG. 2, the rear camera 10 is mounted at the center of the back of the vehicle G of interest, such as, for example, above the number plate. The angle of view A of the rear camera 10 is set nearly to 180 degrees. An angular range B, which is part of the angle of view A (B<A), is used to photograph a left-side detection range including the adjacent lane on the left side. Another angular range C (C=B) is used to photograph a right-side detection range including the adjacent lane on the right side. When the vehicle G backs up, the rear camera 10 displays an image behind the vehicle G on a display device in the room of the vehicle G. While the vehicle G is running, part of the imaging range is assigned to the left-side detection range and right-side detection range.

In FIG. 3, a rectangular area H indicates a frame buffer of the rear camera 10 and a circular area C, part of which is missing, indicates an image behind the vehicle G, the image being captured through a fish-eye lens. On these images, a range S1, in which a rear vehicle that is traveling in the adjacent lane on the left side is located diagonally behind the vehicle G, is extracted as the left-side partial image. Similarly, on these images, a range S2, in which a rear vehicle that is traveling in the adjacent lane on the right side is located diagonally behind the vehicle G, is extracted as the right-side partial image.

Although, in some forms, a single rear camera 10 is used to photograph both the left-side detection range and right-side detection range, a left-side camera may be mounted on the left surface of the vehicle G (for example, below the left door mirror) to photograph the left-side detection range. Similarly, a right-side camera may be mounted on the right surface of the vehicle G (for example, below the right door mirror) to photograph the right-side detection range.

The image memory 12 stores images captured by the rear camera 10 on a per-frame basis at a time at a predetermined frame rate (for example, 30 frames/second).

The image-in-detection-range extracting unit 14 reads out a frame-specific image that had been captured by the image memory 12 and has been stored in the image memory 12. Afterwards, the image-in-detection-range extracting unit 14 extracts, from the image, the left-side partial image S1 corresponding to the left-side detection range and the right-side partial image S2 corresponding to the right-side detection range.

The high-brightness region detecting unit 16 detect a high-brightness region, which is constituted by pixels with brightness equal to or higher than a predetermined value, included in the left-side partial image S1 and right-side partial image S2 extracted by the image-in-detection-range extracting unit 14. Although the lit headlight of another vehicle (rear vehicle) that is traveling in the adjacent lane on the left side or right side is assumed as this high-brightness region, lit street lamps, lamps in a tunnel, and other peripheral light may also be included.

The summarizing unit 18 summarizes the number of frames in which a high-brightness region is included from images for N frames obtained up to now (for example, 20 frame images that have been contiguously obtained). This summarization of the number of frames is repeated each time an image of a new frame is obtained and is performed separately for the left-side partial image S1 and the right-side partial image S2. If, for example, a high-brightness region corresponding to the lit headlight of the rear vehicle is included in the left-side partial image S1 (or right-side partial image S2) included in the latest frame and no high-brightness region is included in the images of the previous 19 frames, 1 is obtained as the number of summarized frames. If the rear vehicle is approaching the vehicle G after that, the high-brightness region corresponding to the lit headlight of the same rear vehicle is included in each subsequent frame, so the number of summarized frames is increased to 2, 3, 4, and so on. When this number reaches 20, this value is maintained.

The vehicle detecting unit 20 detects another vehicle that is approaching the vehicle G in an adjacent lane according to high-brightness regions included in images captured by the rear camera 10. Specifically, when the number of frames summarized by the summarizing unit 18 reaches a predetermined value (for example, 19), the vehicle detecting unit 20 detects a rear vehicle that is approaching.

If the vehicle detecting unit 20 detects a rear vehicle that is approaching, the warning start deciding unit 22 commands the warning processing unit 24 to start a predetermined warning operation.

The warning processing unit 24 warns the driver of the vehicle G in a certain manner to notify the driver that a rear vehicle is approaching. Specifically, upon receipt of a command to start the warning operation from the warning start deciding unit 22, the warning processing unit 24 warns the driver in a certain manner. For example, the warning processing unit 24 displays, on the display unit 28, a predetermined display indicating that a rear vehicle is approaching. The display unit 28 may be attached, for example, ahead of the driver seat or by using part of the left or right door mirror. If the vehicle G attempts to change the lane to an adjacent lane in which a rear vehicle is approaching (if the direction indication determining unit 26 determines that a direction indicator is operating to indicate a change to an adjacent lane on which a rear vehicle is approaching), the warning processing unit 24 outputs a predetermined warning sound from the speaker 30. The warning operation performed by the warning processing unit 24 is continued until the warning termination deciding unit 36 outputs a command to terminate the warning operation.

The direction indication determining unit 26 determines the operation state of the direction indicators (winkers) of the vehicle G, and if a direction indicator is operating, determines the indicated direction (right or left). This determination result is sent to the warning processing unit 24.

The area calculating unit 32 calculates the area (for example, the number of pixels) of a high-brightness region detected by the high-brightness region detecting unit 16. In this calculation, the high-brightness region corresponding to the image of the latest frame is used.

The count reduction deciding unit 34 decides whether the number of frames obtained by the summarizing unit 18 has increased or decreased. Specifically, the count reduction deciding unit 34 uses the least squares method to calculate the inclination of M frames (for example, 10 frames) obtained in the summarization performed by the summarizing unit 18. If the inclination is negative, the count reduction deciding unit 34 decides that the number of frames obtained in the summarization by the summarizing unit 18 has decreased.

If the count reduction deciding unit 34 decides that the number of frames has decreased and the area calculated by the area calculating unit 32 has fallen to or below a predetermined value, the warning termination deciding unit 36 commands the warning processing unit 24 to terminate the warning operation. The predetermined value is set by estimating the size of the headlight of a rear vehicle when it passes the vehicle G. A value smaller than the size of this headlight and larger than the high-brightness region corresponding to peripheral light is used as the predetermined value.

In the above description, the rear camera 10 corresponds to an imaging means, the image-in-detection-range extracting unit 14, high-brightness region detecting unit 16, and vehicle detecting unit 20 correspond to a vehicle detecting means, the warning processing unit 24, display unit 28, and speaker 30 correspond to a warning means, the warning start deciding unit 22 corresponds to a warning start deciding means, the summarizing unit 18 corresponds to a counting means, the area calculating unit 32 corresponds to an area calculating means, and the count reduction deciding unit 34 and warning termination deciding unit 36 correspond to a warning stop deciding means.

The vehicle detection warning device 1 in this form is structured as described above. The operation of the vehicle detection warning device 1 will be described below.

Figure 4:
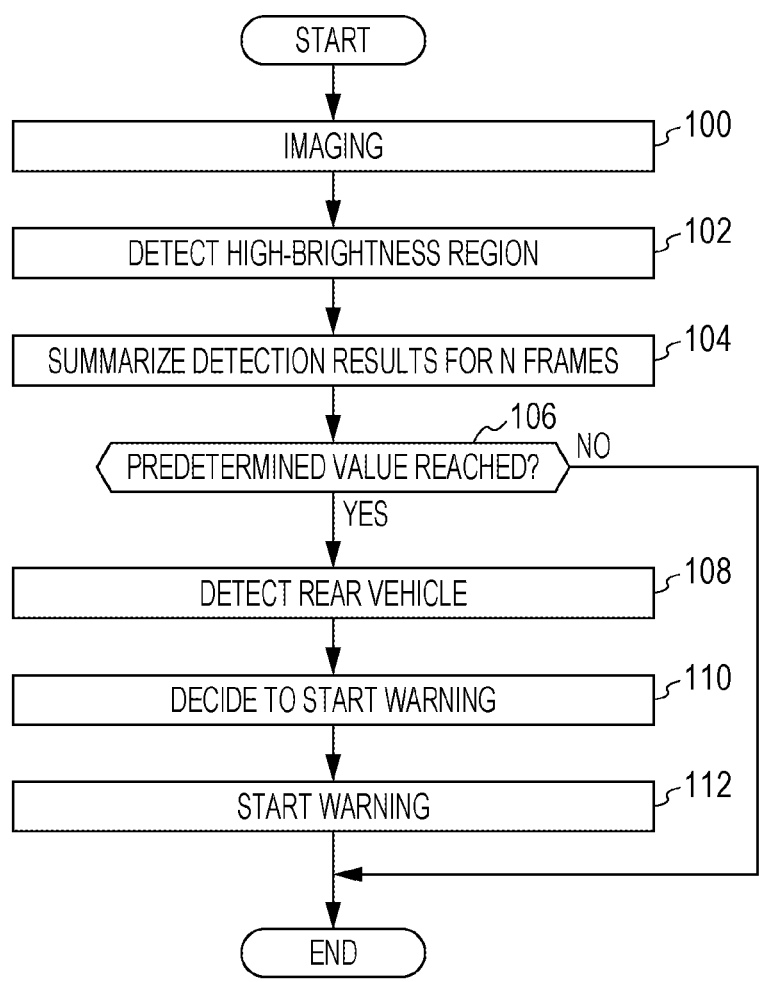
FIG. 4 is a flowchart illustrating an operation procedure for starting a warning operation when a rear vehicle is approaching from the back of a vehicle of interest.

FIG. 4 is a flowchart illustrating an operation procedure for starting a warning operation when a vehicle is approaching from the rear of the vehicle G. The operation procedure in FIG. 4 is repeated each time an image of each frame is captured by the rear camera 10.

The rear camera 10 captures an image behind the vehicle G for one frame (step 100). The captured image is stored in the image memory 12. The image-in-detection-range extracting unit 14 extracts the left-side partial image S1 and the right-side partial image S2 from the image. Afterwards, the high-brightness region detecting unit 16 detects a high-brightness region included in the left-side partial image S1 and a high-brightness region included in the right-side partial image S2 (step 102).

From images for N frames obtained up to now, the summarizing unit 18 summarizes the number of frames in which a high-brightness region is included (step 104). This summarization operation and operations described below are performed for each of the left-side partial image S1 and right-side partial image S2.

Next, the vehicle detecting unit 20 decides whether the number of frames obtained in the summarization has reached the predetermined value (step 106). If the number of frames has not reached the predetermined value, a negative result is obtained, in which case a series of operations to decide whether to start the warning operation is terminated. If the number of frames has reached the predetermined value, a positive result is obtained in the decision in step 106, in which case the vehicle detecting unit 20 detects the presence of a rear vehicle that is approaching (step 108).

If a rear vehicle that is approaching is detected by the vehicle detecting unit 20, the warning start deciding unit 22 decides to start the warning operation (step 110) and commands the warning processing unit 24 to start the warning operation. Thus, the warning operation performed by the warning processing unit 24 starts (step 112).

FIG. 5 is a flowchart illustrating an operation procedure for terminating the warning operation after it has been started. The operation procedure in FIG. 5 is repeated each time an image of a frame is captured by the rear camera 10, as in the operation procedure in FIG. 4.

The rear camera 10 captures an image behind the vehicle G for one frame (step 200). The captured image is stored in the image memory 12. The image-in-detection-range extracting unit 14 extracts the left-side partial image S1 and the right-side partial image S2 from the image. Afterwards, the high-brightness region detecting unit 16 detects a high-brightness region included in the left-side partial image S1 and a high-brightness region included in the right-side partial image S2 (step 202). From images for N frames obtained up to now, the summarizing unit 18 summarizes the number of frames in which a high-brightness region is included (step 204). For an image of each frame, the operation procedure in FIG. 5 is performed while the operation procedure in FIG. 4 is in progress (the sequence may be reversed). Therefore, since the operations in steps 100, 102, and 104 in FIG. 4 are the same as the operations in steps 200, 202, and 204 in FIG. 5, either of the operations in these steps in FIG. 4 and in FIG. 5 may be omitted.

Next, the count reduction deciding unit 34 uses the least squares method to calculate the inclination of M frames obtained in the summarization performed by the summarizing unit 18 (step 206) and decides whether the inclination is negative (step 208). If the inclination is not negative, a negative result is obtained, in which case the warning operation is continued. If the inclination of the number of frames is negative, a positive result is obtained in the decision in step 208.

Next, the area calculating unit 32 calculates the area of the high-brightness region corresponding to the image of the latest frame (step 210). The warning termination deciding unit 36 decides whether the calculated area is equal to or smaller than the predetermined value (step 212). If the calculated value is larger than the predetermined value, a negative result is obtained, in which case the warning operation is continued. If the calculated area is equal to or less than the predetermined value, a positive result is obtained in the decision in step 212.

Next, the warning termination deciding unit 36 decides to terminate the warning operation (step 214) and commands the warning processing unit 24 to terminate the warning operation. This terminates the warning operation performed by the warning processing unit 24 (step 216).

Figure 6A:
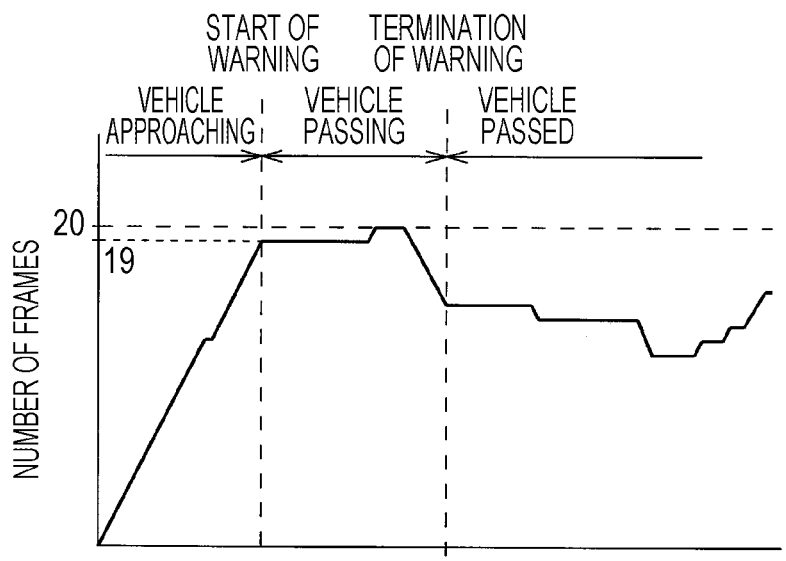
FIGS. 6A to 6C illustrate when to terminate the warning operation.
Figure 6B:
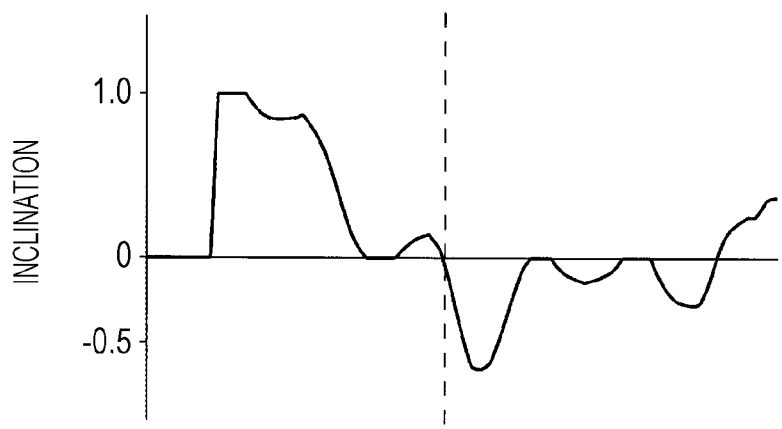
Figure 6C:
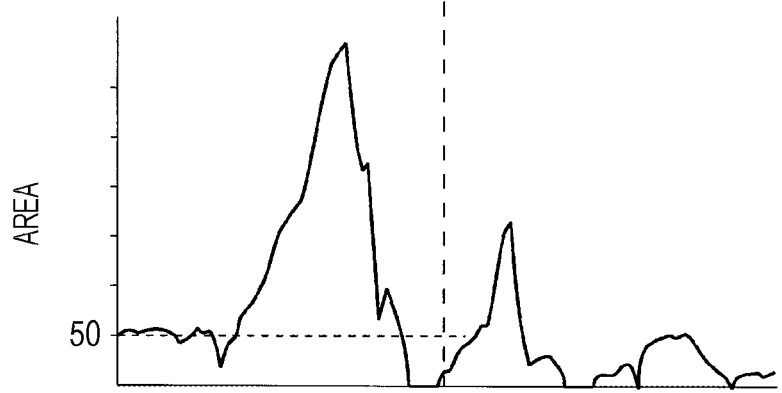

FIGS. 6A to 6C illustrate when to terminate the warning operation. FIG. 6A illustrates a change in the number of frames obtained in the summarization performed by the summarizing unit 18. When the number of frames reaches the predetermine value, a rear vehicle is detected and the warning operation starts. FIG. 6B illustrates the inclination of a change in the number of frames in FIG. 6A. Specifically, FIG. 6B illustrates a change in inclination obtained in the calculation performed by the count reduction deciding unit 34. FIG. 6C illustrates a change in the area obtained in the calculation performed by the area calculating unit 32.

At a time when the inclination indicated in FIG. 6B becomes negative (this time does not have to be a time immediately after the inclination has become negative; a time at which the inclination has fallen to or below a value slightly smaller than 0 (for example, −0.3) may be handled as having become negative), the warning termination deciding unit 36 confirms that the area illustrated in FIG. 6C is equal to or less than the threshold (for example, 50) and decides to terminates the warning operation.

As described above, the vehicle detection warning device 1 in this embodiment detects a high-brightness region corresponding to the headlight of a rear vehicle while the vehicle G is traveling, for example, at night or in a tunnel, so that the vehicle detection warning device 1 can detect a rear vehicle that is approaching and can start a warning operation. When the number of times the high-brightness region is counted decreases and the area of the high-brightness region falls to or below a predetermined value, the warning operation is terminated. Therefore, effects by street lamps, lamps in a tunnel, and other peripheral light other than the headlight of the rear vehicle can be lessened, and when the rear vehicle has passed the vehicle G, the warning operation can be reliably terminated.

The rear camera 10 performs imaging at a predetermined frame rate, and the summarizing unit 18 summarizes the number of frames that includes a high-brightness region from images for N frames obtained up to now. Thus, it is possible to prevent a malfunction in which peripheral light is detected as a high-brightness region and a warning operation is thereby performed.

The count reduction deciding unit 34 uses the least squares method to calculate the inclination of M frames obtained in the summarization performed by the summarizing unit 18. If the inclination is negative, the count reduction deciding unit 34 decides that the number of summarized frames has decreased. Thus, it is possible to eliminate temporary effects such as incorrect detection, to decide at a high precision that another vehicle has passed the vehicle G, and to terminate the warning at an appropriate time.

When the number of frames summarized by the summarizing unit 18 reaches a predetermined value, the warning start deciding unit 22 decides to start a warning. This enables a warning to be started when it is ascertained that a rear vehicle is approaching the vehicle G.

The present disclosure is not limited to the above embodiment and can be practiced in various other forms without departing from the spirit and scope of the present invention. In the warning operation in the above embodiment, for example, a warning sound has been output and predetermined display has been displayed. However, only one of these operations may be performed.

In the above embodiment, a warning has been generated when a rear vehicle that is approaching the vehicle of interest in a lane adjacent to the driving lane of the vehicle of interest, in which the vehicle of interest is traveling, is detected. However, a warning may be generated when a rear vehicle that is approaching the vehicle of interest on the driving lane is detected or when a rear vehicle that is approaching the vehicle of interest on one of the driving lane and an adjacent lane is detected.

As described above, in forms of the present disclosure, while the vehicle of interest is traveling, for example, at night or in a tunnel, a high-brightness region corresponding to the headlight of another vehicle is detected. Therefore, it is possible to detect the rear vehicle that is approaching and to start a warning. When the number of times the high-brightness region is counted decreases and the area of the high-brightness region falls to or below a predetermined value, the warning is terminated. Therefore, effects by street lamps, lamps in a tunnel, and other peripheral light other than the headlight of the other vehicle can be lessened, and when the other vehicle has passed the vehicle of interest, the warning can be reliably terminated.

It is therefore intended that the foregoing detailed description be regarded as illustrative rather than limiting, and that it be understood that it is the following claims, including all equivalents, that are intended to define the spirit and scope of this invention.

What is claimed is:

1. A vehicle detection warning device comprising:
    an imaging unit configured to capture an image behind a vehicle of interest;
    a memory configured to store the image captured by the imaging unit; and
    a processor in communication with the memory and configured to execute instructions stored in the memory and to act as:
        a vehicle detecting unit configured to detect another vehicle that is approaching the vehicle of interest in a lane in which the vehicle of interest is traveling or in an adjacent lane, according to a high-brightness region included in an image obtained by imaging performed by the imaging unit;
        a warning unit configured to warn a driver of the vehicle of interest in a certain manner to notify the driver that the another vehicle is approaching;
        a warning start deciding unit configured to cause the warning unit to start a warning when the vehicle detecting unit detects the another vehicle;
        a counting unit configured to count a number of times, over a period of time, that the high-brightness region is included in a frame of successive frames obtained by a plurality of imaging operations performed by the imaging unit;
        an area calculating unit configured to calculate an area of the high-brightness region; and
        a warning stop deciding unit configured to:
            cause the warning unit to stop the warning when the number of times, over the period of time, that the high-brightness region is included in a frame of successive frames as counted by the counting unit decreases and the area of the high-brightness region calculated by the area calculating unit falls to or below a predetermined value;
            wherein the warning stop deciding unit is configured to decide whether the number of times counted by the counting unit has decreased based on a plurality of counting results of the number of times, over the period of time, that the high-brightness region is included in a frame of successive frames counted by the counting unit.

2. The vehicle detection warning device according to claim 1, wherein:
    the imaging unit is further configured to perform imaging at a predetermined frame rate; and
    the counting unit is further configured to summarize a number of frames that the high-brightness region is included in a frame of the images from N frames obtained until a present time.

3. The vehicle detection warning device according to claim 1, wherein the warning stop deciding unit is configured to utilize a least squares method to calculate an inclination of a plurality of times counted by the counting unit, and if the inclination is negative, to decide that the number of times counted by the counting unit has decreased.

4. The vehicle detection warning device according to claim 1, wherein
    when the number of times counted by the counting unit reaches a predetermined value, the warning start deciding unit is configured to decide to start the warning.

5. A vehicle detection warning method comprising:
    a step in which an imaging unit captures an image behind a vehicle of interest;
    a step in which a processor of a vehicle detecting warning device detects another vehicle that is approaching the vehicle of interest in a lane in which the vehicle of interest is traveling or in an adjacent lane, according to a high-brightness region included in an image obtained by imaging performed by the imaging unit;
    a step in which the processor warns a driver of the vehicle of interest in a certain manner to notify the driver that the another vehicle is approaching;
    a step in which the processor causes a warning to start when the processor detects the another vehicle;
    a step in which the processor counts a number of times, over a period of time, that the high-brightness region is included in a frame of successive frames obtained by a plurality of imaging operations performed by the imaging unit;
    a step in which the processor calculates an area of the high-brightness region; and
    a step in which the processor stops the warning when the number of times, over the period of time, that the high-brightness region is included in a frame of successive frames as counted by the processor decreases and the area of the high-brightness region calculated by the processor falls to or below a predetermined value;
    wherein the processor decides whether the number of times counted by the processor has decreased based on a plurality of counting results of the number of times, over the period of time, that the high-brightness region is included in a frame of successive frames.

* * * * *